(12) United States Patent
Masood (10) Patent No.: US 11,379,509 B2
(45) Date of Patent: Jul. 5, 2022

(54) SYSTEMS AND METHODS FOR CREATING AN ONTOLOGY USING UNSUPERVISED LEARNING

(71) Applicant: UST Global (Singapore) Pte. Ltd., Singapore (SG)

(72) Inventor: Adnan Masood, Aliso Viejo, CA (US)

(73) Assignee: UST Global (Singapore) Pte. Ltd., Singapore (SG)

( * ) Notice: Subject to any disclaimer, the term of this patent is extended or adjusted under 35 U.S.C. 154(b) by 429 days.

(21) Appl. No.: 16/666,843

(22) Filed: Oct. 29, 2019

(65) Prior Publication Data

US 2021/0034652 A1    Feb. 4, 2021

Related U.S. Application Data

(60) Provisional application No. 62/882,359, filed on Aug. 2, 2019.

(51) Int. Cl.
*G06F 40/00* (2020.01)
*G06F 16/36* (2019.01)
*G06N 3/08* (2006.01)
*G06N 20/00* (2019.01)
*G06F 16/901* (2019.01)
*G06F 40/30* (2020.01)
*G06F 40/284* (2020.01)
*G06F 40/211* (2020.01)

(52) U.S. Cl.
CPC ........ *G06F 16/367* (2019.01); *G06F 16/9024* (2019.01); *G06F 40/30* (2020.01); *G06N 3/088* (2013.01); *G06N 20/00* (2019.01); *G06F 40/211* (2020.01); *G06F 40/284* (2020.01)

(58) Field of Classification Search
CPC combination set(s) only.
See application file for complete search history.

*Primary Examiner* — Vu B Hang
(74) *Attorney, Agent, or Firm* — Nixon Peabody LLP (57) ABSTRACT

A system is configured to: (a) ingest a set of codes from a code reference, the code reference including words and non-words; (b) associate the set of codes to a set of representations, forming descriptive links between the set of codes and the set of representations; (c) ingest an unstructured document having a general outline, the unstructured document including (i) at least one of the words in the code reference, (ii) at least one code in the set of codes, or (iii) both (i) and (ii); (d) determine an ontology from content of the unstructured document with an unsupervised learning algorithm; and (e) store the determined ontology in a database, the ontology having an acyclic directed graph structure.

20 Claims, 3 Drawing Sheets

SYSTEMS AND METHODS FOR CREATING AN ONTOLOGY USING UNSUPERVISED LEARNING

CROSS-REFERENCE TO RELATED APPLICATIONS

This application claims the benefit of U.S. Provisional Patent Application Ser. No. 62/882,359, filed Aug. 2, 2019, which is incorporated herein by reference in its entirety.

TECHNICAL FIELD

The present disclosure relates to creating an ontology using unsupervised learning and more specifically to systems and methods that map domain-specific words and non-words to create an ontology.

BACKGROUND

A language is an example of a system that involves developing, maintaining, and using complex systems of communication. Humans over millennia have developed thousands of languages. Languages continue to emerge today, and some already existing languages continue to evolve and adapt to describe and capture an ever-changing human society. Some drivers of change in human languages have included technological innovation, discovery, cultural clashes, cultural isolation, accents, portmanteaus, etc. "Cannabusiness," a portmanteau of *cannabis* and business, is officially recognized as an English word in the Oxford English Dictionary, after over thirty years of unofficial use in writing. Adding, repurposing, and retiring words in a human-spoken language can be a common phenomenon.

Within a specific human language, there can be subsets of domain-specific languages. These subset of domain-specific languages do not necessarily share a common alphabet with the specific human language. For example, a business or an industry can develop a set of codes that quickly convey a meaning within the business or the industry, but can be incomprehensible to others outside of the business or industry. For example, an offhand comment on satisfying 102 requirements is understood within a patent law community as one thing, but in another law community, it may mean something else. Furthermore, in another industry, "satisfying 102 requirements" may not convey any meaning at all even though it is understood that English is being spoken. Human words in a particular human language have an understanding to humans who understand that human language, but non-words, divorced of any context, have no meaning. A non-word per se is a sequence of letters and/or numbers and/or characters that have no meaning in a human-spoken language. For example, a non-word would not be found in a dictionary of the human language.

Domain-specific languages have become ubiquitous in society with the balkanization of subject areas and increased specialization within these subject areas. A domain is a specified sphere of knowledge, such as contract law, healthcare, retail industry, software development, and the like. It can oftentimes become difficult to comprehend and interpret writing meant for an audience in a specific subject area. For example, in a healthcare business context, many different non-word codes exist depending on which side of the healthcare business one finds himself. For example, a physician can use one set of codes, ambulance transport personnel can use another set of codes, an insurance billing professional can use yet another set of codes, etc. One patient can be serviced by each of these individuals, and language barriers between the three individuals can prevent obtaining accurate information and can affect care of the patient.

Conventional word vector approaches operate on corpora of human-understood words. While conventional word vector approaches seek to find relationships or analogies among word pairs or word combinations, such as London:Paris or England:France, they do not try to construct new relationships among words and non-words. Constructing ontologies that explain relationships or analogies among words and non-words is a far more challenging problem, because the non-words by themselves are divorced of any meaningful context, unlike words that have a priori meanings to humans who understand them.

The present disclosure provides systems and methods that address drawbacks associated with domain-specific languages and also provide additional benefits.

SUMMARY

Some implementations of the present disclosure provide an iterative system for dynamically creating and updating an ontology using unsupervised learning. The system includes a non-transitory computer-readable medium storing computer-executable instructions thereon such that when the instructions are executed, the system is configured to ingest a set of codes from a code reference. The code reference includes non-words and words, and each code in the set of codes includes at least one of the non-words in the code reference. The system is further configured to associate the set of codes to a set of representations, forming descriptive links between the set of codes and the set of representations, with each representation in the set of representations including at least one of the words in the code reference. The system is further configured to ingest an unstructured document having a general outline. The unstructured document includes (i) at least one of the words in the code reference, (ii) at least one code in the set of codes, or (iii) both (i) and (ii). The system is further configured to determine the ontology from content of the unstructured document with an unsupervised learning algorithm that takes as inputs (i) the general outline of the unstructured document, (ii) the set of codes, (iii) the set of representations, and (iv) the descriptive links between the set of codes and the set of representations. The system is further configured to store the determined ontology in a database, with the ontology having an acyclic directed graph structure.

Some implementations of the present disclosure provide an iterative system for dynamically creating and updating an ontology using unsupervised learning. The system includes a non-transitory computer-readable medium storing computer-executable instructions thereon such that when the instructions are executed, the system is configured to ingest a set of codes from a code reference, with the code reference including non-words and words, and each code in the set of codes including at least one of the non-words in the code reference. The system is further configured to associate the set of codes to a set of representations, forming descriptive links between the set of codes and the set of representations, with each representation in the set of representations including at least one of the words in the code reference. The system is further configured to receive domain defined structure document, the domain defined structure document including parameters for at least one of (i) parent nodes of the ontology, (ii) child nodes of the ontology, or (iii) both (i) and (ii). The system is further configured to determine the ontology with an unsupervised learning algorithm that takes as inputs (i) the domain defined structure document, (ii) the set of codes, (iii) the set of representations, and (iv) the descriptive links between the set of codes and the set of representations. The system is further configured to store the determined ontology in a database, with the ontology having an acyclic directed graph structure.

Some implementations of the present disclosure provide an iterative method for dynamically creating and updating an ontology using unsupervised learning. A set of codes is ingested from a code reference, with the code reference including non-words and words, and each code in the set of codes including at least one of the non-words in the code reference. The set of codes are associated with a set of representations, forming descriptive links between the set of codes and the set of representations, with each representation in the set of representations including at least one of the words in the code reference. an unstructured document having a general outline is ingested. The unstructured document includes (i) at least one of the words in the code reference, (ii) at least one code in the set of codes, or (iii) both (i) and (ii). The ontology is determined from content of the unstructured document with an unsupervised learning algorithm that takes as inputs (i) the general outline of the unstructured document, (ii) the set of codes, (iii) the set of representations, and (iv) the descriptive links between the set of codes and the set of representations. The determined ontology is stored in a database, with the ontology having an acyclic directed graph structure.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Some implementations of the present disclosure provide a system and method for utilizing unsupervised learning to map domain-specific words and non-words and creating an ontology using the mapping. These implementations provide several advantages that allow an individual to quickly extract information from domain-specific text. Domain-specific vocabulary can include words, where meaning of a word can sometimes be deciphered based on context of how the word is being used in its specific human-understood language. For example, "boot" in English already conjures up different meanings from footwear to a car trunk, but based on context of how "boot" is used, an English language speaker can eliminate various meanings and settle upon one meaning.

On the other hand, a domain-specific vocabulary can also include non-words which make reliance on context alone difficult or impossible. When non-words are involved, domain-specific knowledge becomes critical in deciphering meaning. For example, "PSR B1257+12 C" can be referred to in astronomy books while "Phobetor" can be referred to in a science magazine. One who is familiar with "Phobetor" as an exoplanet but not familiar with "PSR B1257+12 C" (a non-word) as its designation cannot readily understand that "Phobetor" is "PSR B1257+12 C." Furthermore, domain-specific language is highly susceptible to top-down changes. For example, "Phobetor" is alternatively designated as "PSR B1257+12 d." Those unfamiliar with the new designation would not readily equate "PSR B1257+12 d" with "PSR B1257+12 C" if they were not privy to the fact that both refer to "Phobetor." These top-down changes in nomenclature can be common in domain-specific vocabulary.

Embodiments of the present disclosure leverage the power of unsupervised learning to dynamically create and autonomously update ontologies (which can also be called taxonomies). Ontologies provide a representation and relationship between concepts and entities within a specific domain. Ontologies reduce a search space such that relevant domain-specific knowledge is captured without including knowledge from other areas of disinterest. For example, a broad search on "contact firing" without much context can provide information on gunshot wounds, point blank shooting, and solar cell screen printing. An ontology for solar cell fabrication should not include point blank shooting or gunshot wounds when referring to contact firing because these meanings are very far apart and unrelated to the domain of solar cell fabrication. Embodiments of the present disclosure can create an ontology that can be used in interpreting one or more different documents within a same or related field. Due to the unsupervised learning aspect of the embodiments of the present disclosure, top-down changes can be propagated throughout the ontology without significant effort.

Figure 1:
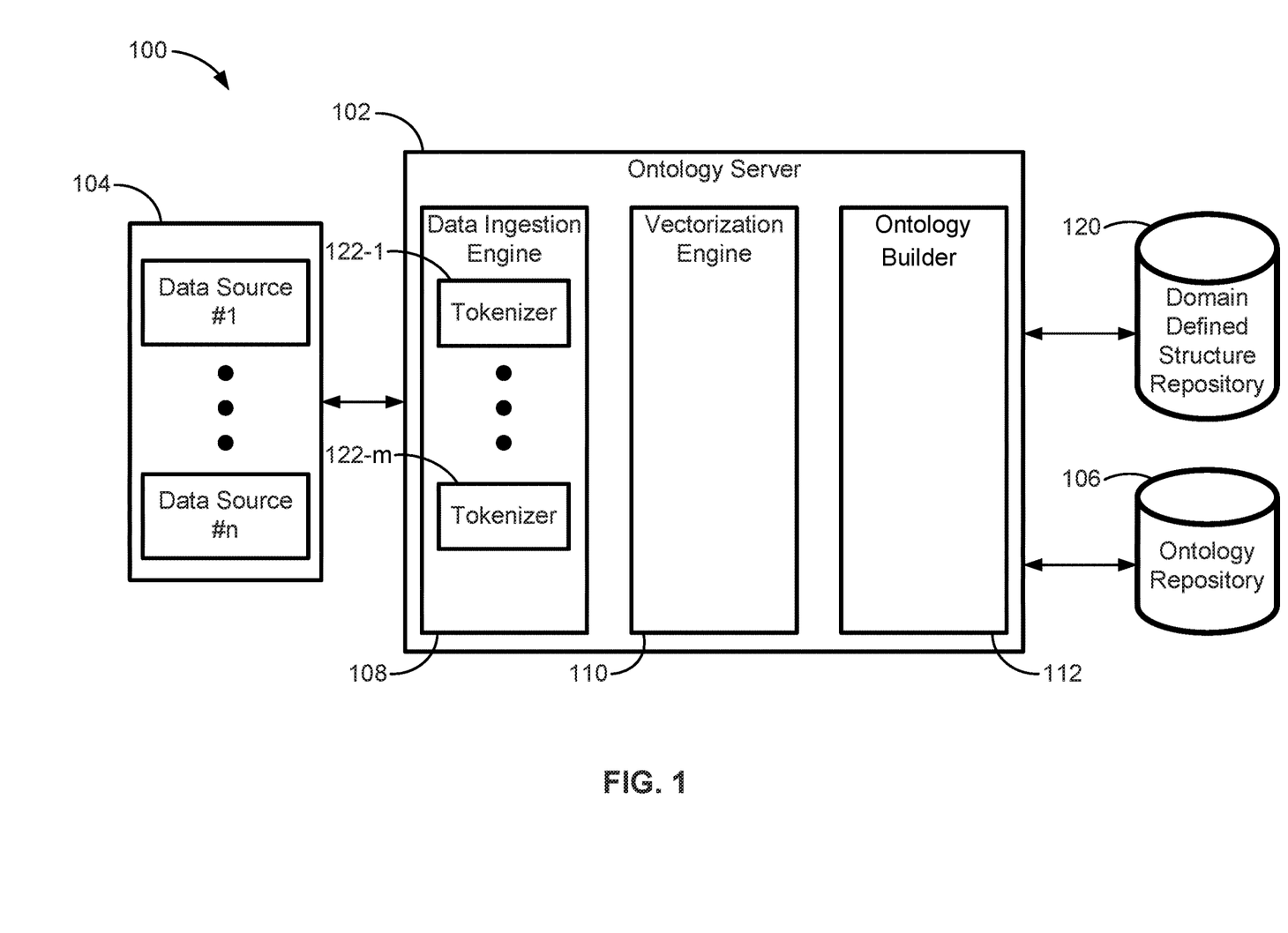
FIG. 1 illustrates a block diagram of a system for generating and updating an ontology according to some implementations of the present disclosure.

FIG. 1 illustrates a block diagram of a system 100 for automatically generating and updating an ontology according to some implementations of the present disclosure. To simplify discussion, the singular form will be used for components identified in FIG. 1 when appropriate, but the use of the singular does not limit the discussion to only one of each such component. The system 100 includes an ontology server 102, one or more data sources 104, and an ontology repository 106. In some implementations, the system 100 includes a domain defined structure repository 120.

The one or more data sources 104 are depicted as data source 1, . . . data source n. The one or more data sources 104 can include structured and unstructured data sources. Examples of structured data sources include data logs, dictionaries, documents organized with key-value pair conception, databases, excel worksheets, relational and non-relational data repositories, comma separated values (CSV)

files, tab separated values (TSV) files, structured documents with well-identified columns, etc. Examples of unstructured data sources include novels, health plans and benefits documents, generic text files, standard operating procedures, wiki documents, log files, system activity logs, application telemetry files, application logs, etc.

The ontology server 102 is configured to receive data from the one or more data sources 104 and create an ontology that represents knowledge from the one or more data sources 104. The ontology server 102 includes a data ingestion engine 108 configured to obtain and import data from the one or more data sources 104. An engine is a combination of hardware and software configured to perform specific functionality. The data ingestion engine 108 can include one or more tokenizers 122-1, ... 122-m. The tokenizers 122-1, ... 122-m convert the data obtained from the one or more data sources 104 into a sequence of tokens. Each of the tokenizers 122-1, ... 122-m converts a different data type. For example, the data source 1 can provide data as a character sequence, and the tokenizer 122-1 is designed to tokenize the character sequence. In another example, the data source 2 can provide data as an image file, and the tokenizer 122-2 is designed to tokenize the image file. Other examples of data formats for the one or more data sources 104 include files that outline terminologies and keywords, industry specific jargon, keywords and terms, numeric code, etc., and each of these data formats can have a corresponding tokenizer in the data ingestion engine 108.

In some implementations, during tokenizing, one or more algorithms can be employed. For example, any of the tokenizers 122-1, ... 122-m can employ n-gram to group words as size 1, size 2, size 3, and so on.

The ontology server 102 can further include a vectorization engine 110. The vectorization engine 110 is configured to create vectors or word embeddings from the tokens provided by the one or more tokenizers 122-1, ... 122-m. The vectorization engine 110 can create vectors in one of many ways. The vectorization engine 110 can produce a distributed representation of words using, e.g., a continuous bag of words approach, skip grams, or other word embedding algorithms and techniques including GloVe, word2vec, fastText, etc. The vectorization engine 110 firstly ingests a corpus of text from the one or more data sources 104 that contains entities. The vectorization engine 110 learns a representation for the entities contained in the corpus of text. In some implementations, nearby context words within the corpus of text are used to infer meaning and relationship between words. The entities can include alphabetic text, alphanumeric text, symbolic text, numeric text, or any combination thereof.

In some implementations, string matching is performed prior to creating the vector. For example, a direct string matching or direct entity matching is employed by the vectorization engine 110 such that vector representations of entities that match a received string from the data ingestion engine 108 is selected from an already created list of vector representations. That is, if a vector representation already exists for "tomato," then receiving "tomato" from the data ingestion engine 108 will include a comparison of "tomato" to "tomato" and selecting the existing vector representation for "tomato."

In some implementations, fuzzy matching is combined with string matching to take into account misspellings. For example, if a vector representation already exists for "tomato," then receiving "tamato" from the data ingestion engine 108 will include determining a distance between "tamato" and other strings that already have vector representations. In some implementations, "tamato" can be found to be closest to "tomato" with a 95% probability that "tamato" is supposed to be "tomato." When a certain threshold is reached, for example, 75%, 80%, 90%, 95%, etc., then the vectorization engine 110 can assume both words or strings are the same. During fuzzy matching, the vectorization engine 110 can employ Levenshtein distance, Euclidean distance, etc., to determine distance between words to further inform the probability that a first word may be a misspelling of a second word.

In some implementations, string matching can be performed by the vectorization engine 110 using hash values. For example, the vectorization engine 110 determines a hash value for "tomato" and compares the hash value for "tomato" with hash values of words or strings that already have vector representations. When the hash value for "tomato" matches any other hash value, then the vectorization engine 110 will use the vector representation linked to the hash value that matches the hash value for "tomato" to represent "tomato."

In some implementation, direct string matching, fuzzy matching, and/or using hash values can be employed for string matching based on the data source. For example, the data ingestion engine 108 can use a tokenizer specialized for a data source that stores images of documents. The tokenizer can use optical character recognition (OCR) to extract strings from the images, and the vectorization engine 110 can employ fuzzy matching to correct for misspellings resulting from the OCR algorithm prior to direct string matching.

The vectorization engine 110 is also configured to map entities in a domain similarity search space (DSSS). The DSSS is a sub-space in a large vector space, which follows the essential properties of the topological space and includes a vector space with its own representative hierarchy based on the domain. The DSSS includes space with its own representative hierarchy based on the domain. For example, in the English language vocabulary represented as a vector space, medical jargon can be a sub-space where specific medical terminologies are represented as entities with their own relevant meanings as a dimension different from a typical representation in the English language vector space. The DSSS subspace imports symmetry from a higher-dimensional space while building relationship with associated terms by introducing a new vector dimension. The vectorization engine 110 can employ clustering to relate vector mappings of the entities in the DSSS.

The ontology server 102 can further include an ontology builder 112 that takes the vector representations and the clustered mappings from the vectorization engine 110 to develop an ontology (also known as a taxonomy). Put simply, an ontology can be understood as contextualizing non-words with respect to human-understood words, so that relationships or links between non-words and words can be established through deep learning or artificial intelligence. In some implementations, the ontology builder 112 can receive a domain-defined structure from a domain-defined structure repository (e.g., the domain defined structure repository 120) to determine a structure of the parent nodes of the ontology. In some implementations, the ontology builder 112 can rely on a general outline of one or more documents ingested from the one or more data sources 104 to determine a structure of the parent nodes of the ontology. The ontology builder 112 can iteratively build the parent nodes of the ontology, then the child nodes of the ontology, and then the leaf nodes of the ontology.

The ontology builder 112 can provide the ontology as a web ontology language (OWL) file and store the OWL file in the ontology repository 106. Once the OWL file is created, the ontology server 102 can monitor the one or more data sources 104 to determine whether there is a change in any of the one or more data sources 104. If the change is additive (new words or strings are added to the ontology), then the ontology is updated by placing word embeddings of the new words within the context of the present ontology. If the change is an update or a removal (one or more words or strings are removed or one or more words or strings have a different meaning), then the ontology is updated via one or more algorithms. For example, an update or removal can change the structure of the present ontology via a rebalancing of the present ontology. In some implementations, the change to the present ontology is catastrophic so the present ontology is not salvageable, thus the ontology server 102 builds a new ontology.

Each of the ontology server 102, one or more data sources 104, an ontology repository 106, and the domain defined structure repository 120 can include one or more processors and one or more memory devices. The one or more memory devices can store computer-executable instructions that when executed by the one or more processors enable functionality described herein with respect to each of the aforementioned components. Examples of the ontology server 102 include a computer, a server, an application specific integrated circuit, a field programmable gate array, or any combination thereof. Creating and maintaining ontologies using some implementations of the present disclosure can be applied to different domains. To simplify discussion and unify concepts, healthcare domain will be used in the following examples. The use of the healthcare domain is merely illustrative and does not limit applicability of embodiments of the present disclosure.

Figure 2:
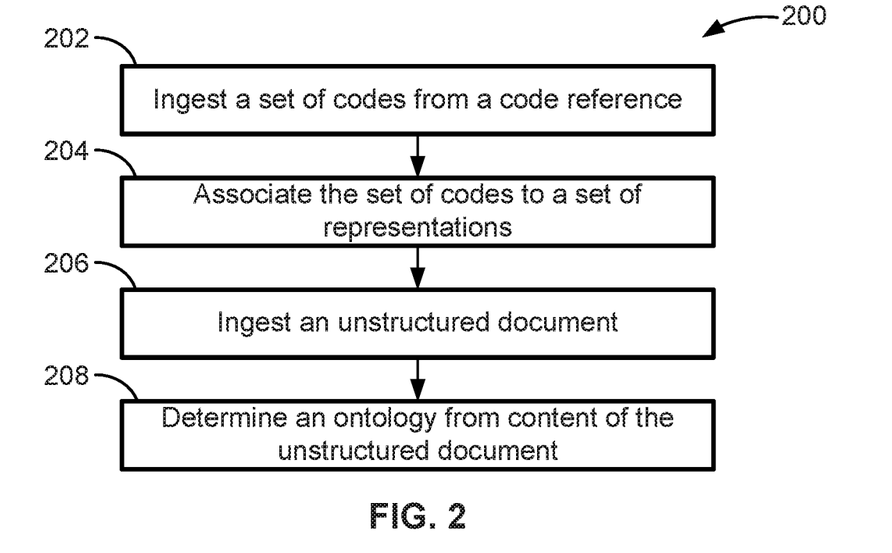
FIG. 2 is a flow diagram showing a process for generating an ontology according to some implementations of the present disclosure.

Referring to FIG. 2, a flow diagram showing a process 200 for generating an ontology according to some implementations of the present disclosure is provided. At step 202, the ontology server 102 ingests a set of codes from a code reference to obtain tokenized representations of the set of codes. The code reference can refer to one or more of the one or more data sources 104. The set of codes can include both words and non-words or just non-words. Examples of non-words include symbols, numbers, alphanumeric text, or any combination thereof. The set of codes can be ingested from more than one data source. For example, the set of codes can include multiple subsets of codes. The subsets of codes can be: (i) International Statistical Classification of Diseases and Related Health Problems (ICD) codes, (ii) current procedural terminology (CPT) codes, (iii) Healthcare Common Procedure Coding System (HCPCS) codes, (iv) stock keeping unit (SKU) codes, or (v) any grouping of non-words. During ingestion, each code in the set of codes is tokenized by the ontology server 102 according to some implementations of the present disclosure.

In some implementations, at step 202, the ontology server 102 can remove stop words from the code reference during the ingestion process. Examples of stop words include commonly used words, such as, "a", "in", "the", etc.

In some implementations, at step 202, the ontology server 102 ingests one or more corpora prior to ingesting the set of codes from the code reference. For example, the ontology server 102 can ingest words from English Gigaword text corpora. In some implementations, at step 202, the ontology server 102 ingests one or more corpora after ingesting the set of codes from the code reference. For example, the ontology server 102 can ingest layman terms, synonyms, state mandates, federal mandates, etc. The synonyms and layman terms can be employed by the ontology server 102 for performing named entity recognition. The types of corpora ingested here can be specific or relevant to the domains for which ontologies are desired to be constructed. For example, if the domain is healthcare, a corpora of healthcare words can be ingested by the ontology server to construct a richer and deeper set of words from which to construct the ontologies.

At step 204, the ontology server 102 associates the set of codes (e.g., non-words) to a set of representations. Each code in the set of the codes is associated with a representation in the set of representations. For example, an ICD code M54.5 can indicate "lower back pain"; M54.5 is the code and the string "lower back pain" is the representation. The ontology server 102 associates a code with a representation based on one or more factors, for example, based on nearby context. The ontology server 102 can use unsupervised learning on an unstructured document to determine that a best guess for ICD code M54.5 is "lower back pain" based on context. The best guess can be based on a proximity between M54.5 and "lower back pain" within the unstructured document. The best guess can be based on an organization of the unstructured document. The ontology server 102 can also use unsupervised learning on a structured document arranged in a key-value pair. For example, the structured document can be a spreadsheet or text file with M54.5 and "lower back pain" on a same line.

Associating a respective code with a respective representation forms a descriptive link between the respective code and the respective representation. A descriptive link can indicate that the respective code is a synonym of the respective representation. A descriptive link can also indicate that the respective code is similar to the respective representation.

The ontology server 102 can employ string matching and fuzzy matching on the set of representations obtained from the code reference, according to some implementations of the present disclosure. String matching and fuzzy matching can be performed on known tokenized terms. For example, if the ontology server 102 previously ingested a dictionary of words like the English Gigaword text corpora, string matching or fuzzy matching can be performed to identify words in the set of representations.

In some implementations, the ontology server 102 creates vectors or word embeddings from the set of representations to obtain a set of vectorized representations. Vectorization is previously described in connection with the vectorization engine 110 of FIG. 1. Based on the associated relationship between the set of codes and the set of representations, the ontology server 102 also creates vectors for the set of codes. The vector created for a respective code in the set of codes, when placed in a vector space, is situated close to or is the same as the vector created for its corresponding representation in the set of representations. For example, a vector representation of M54.5 and "lower back pain" can be a same vector representation or can be two different vector representations where an angle between the two vector representations is below a similarity threshold. That is, the angle between the two different vector representations is measurable such that a similarity between the two different vector representations can be ascertained.

In some implementations, the set of codes can include multiple subsets of codes such that the multiple subsets of codes are associated to a set of representations at different time intervals. For example, ICD codes can be ingested and associated to a set of representations at a first time period, then CPT codes can be ingested and associated, then HCPCS codes can be ingested and associated, and so on. An ordered ingestion and association of the multiple subsets of codes can allow the ontology server 102 to leverage prior knowledge of previous subsets of codes in associating a next subset of codes. For example, in a first time period, the ontology server 102 determined to associate ICD code M54.5 with "lower back pain." In a next time period, HCPCS code G8502 can be associated with "back pain," thus the ontology server 102 can associate a descriptive link between G8502 and "back pain" and also associate a familial, categorical, or synonymous link between G8502 and M54.5.

In some implementations, the ontology server 102 maps entities in a domain similarity search space (DSSS). Entities are representations in the set of representations and codes in the set of codes. The vectorized forms of the representations and the codes can be shown graphically in the DSSS. The ontology server 102 can apply deep learning or machine learning algorithms, for example, clustering, to mapped entities in the DSSS to determine familial or categorical links between the entities.

At step 206, the ontology server 102 ingests an unstructured document having a general outline. In some implementations, the unstructured document can be a health plan and benefits document. In some implementations, the unstructured document includes at least one of the human-understood words in the code reference ingested at step 202. In some implementations, the unstructured document includes at least one code in the set of codes ingested at step 202. In some implementations, the unstructured document includes synonyms or layman terms that map to at least one of the words in the code reference ingested at step 202. In some implementations, stop words are removed from the unstructured document prior to ingesting the unstructured document.

At step 208, the ontology server 102 automatically builds or constructs an ontology from content of the unstructured document or data repository using an unsupervised learning algorithm. The ontology server 102 builds the ontology in an iterative manner by first building parent nodes of the ontology, then building child nodes of the ontology, and then building leaf nodes of the ontology. The ontology server 102 uses vector representations of the set of codes and the set of representations to decipher the unstructured document.

In some implementations, the ontology server 102 takes as inputs the general outline of the unstructured document to build the ontology. For example, a health plan and benefits document provided by an insurance company may not include ICD codes but only describe covered and uncovered health conditions using English words. The health plan and benefits document can have an outline with a section "copays" that includes subsections "preventative care" and "non-preventative care." Using OCR, the ontology server 102 can use font sizes, spacing between text, font emphasis, etc., to identify sections and subsections within the health plan and benefits document. The sections and subsections can identify parent and child nodes, respectively, in the ontology.

In some implementations, the ontology server 102 recognizes layman terms and synonyms in the unstructured document, where the layman terms and synonyms map onto the set of the codes and the set of representations described in step 204.

In some implementations, the ontology server 102 takes into account familial or categorical links determined using the entity-mapping in the DSSS. The ontology server 102 can determine from the DSSS that parent nodes are to be selected from the set of codes. The ontology server 102 can also determine from the DSSS that parent nodes are to be selected from the set of representations.

In some implementations, the ontology server 102 selects parent and child nodes based on relative importance and recurrence of topics within the unstructured document. For example, the importance can be determined by frequency of occurrence of terms within the unstructured document, as well as a top level hierarchical influence the terms have on an overall corpus. For example, terms with highest frequency of occurrence can be indicated as parent nodes. Similarly, terms covering large clusters in the DSSS (having a top level hierarchical influence) can be indicated as parent nodes. Child nodes can be populated using a similar approach applied in reduced order of dependency. That is, terms with a reduced order of dependency to the other topics become corresponding child nodes. The relationship between a parent and child node is based on the domain specific sensitivity mapping.

In some implementations, the ontology server 102 can then output the ontology as an OWL file, storing the OWL file in the ontology repository 106 for further use. The ontology created has a directed acyclic graph structure. A directed acyclic graph is a directed graph with no directed cycles, that uses a topological ordering which is very efficient way of representing such topical hierarchies. Directed acyclic graphs restrict traversals to follow a path from an earlier topic sequence to a later topic sequence, i.e., from a parent node to a child node. Directed acyclic graphs work well in building ontologies because they scale very well. As size of the ontology network increases, the speed and performance also increases. Directed acyclic graphs also remove a need for manual intervention when recalibrating and/or rebalancing the ontology network, thus enabling the system 100 to build ontologies in a more decentralized and easily propagatable manner.

Figure 3:
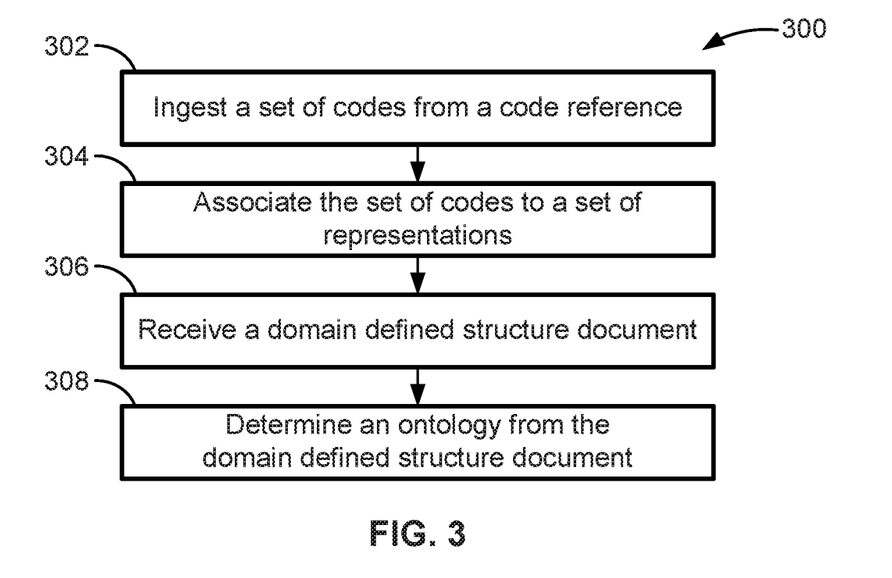
FIG. 3 is a flow diagram showing a process for generating an ontology according to some implementations of the present disclosure.

FIG. 3 is a flow diagram showing a process 300 for generating an ontology according to some implementations of the present disclosure. At step 302, the ontology server 102 ingests a set of codes from a code reference. Step 302 is similar to or the same as step 202 described above in connection with FIG. 2. At step 304, the ontology server 102 associates the set of codes to a set of representations. Step 304 is similar to or the same as step 204 described above in connection with FIG. 2.

At step 306, the ontology server 102 receives a domain defined structure document from the domain defined structure repository 120. The domain defined structure document includes a structure for the ontology such that appropriate parameters for parent nodes and child nodes can be set. For example, the domain defined structure document can include that ICD codes be used as parent nodes because a healthcare ontology organized in such manner is easier to traverse and/or is more intuitive. In another example, the domain defined structure document can include that parent nodes be selected from the set of representations because string-searching the ontology can be more efficient. Other rationale can apply for parameters set by the domain defined structure document.

At step 308, the ontology server 102 determines an ontology from the domain defined structure document. Using specific parameters in the domain defined structure document and unsupervised learning, the ontology server 102 builds the ontology. In some implementations, the domain defined structure document provides a suggested structure that the ontology server 102 does not religiously adhere to. For example, the domain defined structure document can include a suggested structure that probabilistically influences the ontology created by the ontology server 102. As the ontology server 102 applies unsupervised learning in building the ontology, the resultant structure can deviate and depart from the suggested structure provided in the domain defined structure document.

Figure 4:
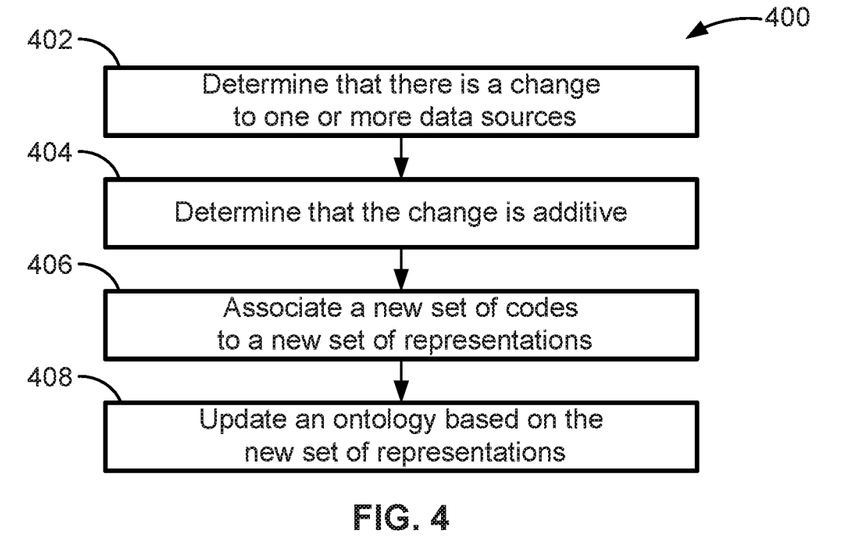
FIG. 4 is a flow diagram showing a process for updating an ontology according to some implementations of the present disclosure.

FIG. 4 is a flow diagram showing a process 400 for updating an ontology according to some implementations of the present disclosure. At step 402, the ontology server 102 determines that there is a change to the one or more data sources 104. For example, a new ICD code may be added, an ICD code may be removed, and/or an ICD code may be repurposed.

At step 404, the ontology server 102 determines that the change is additive. For example, the ontology server 102 determines that a new ICD code is being added. A governing body decided to revise the ICD codes adding a new ICD code in a top-down manner. The ICD code does not exist in the ontology, so the ontology server 102 ingests the new ICD code.

At step 406, the ontology server 102 associates a new set of codes to a new set of representations. Following the previous example, the new ICD code is associated with a new representation, forming a descriptive link between the new ICD code and the new representation. The new ICD code and the new representation can be vectorized and mapped in a DSSS. The DSSS also contains previously mapped entities from when the ontology was created.

At step 408, the ontology server 102 updates the ontology based on the new set of representations. From the previous example, after mapping in the DSSS, cluster groupings can be re-evaluated to determine where the new ICD code fits. Cluster groupings also indicate a location or locations in the ontology which should be revised in order to add the new ICD code to the ontology.

Figure 5:
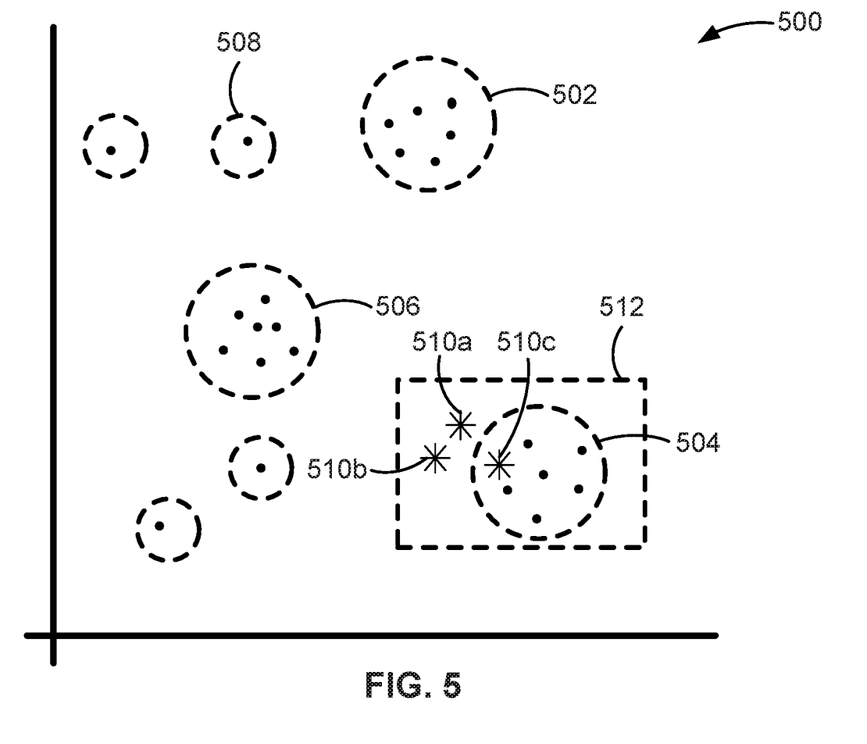
FIG. 5 illustrates an example of a domain similarity search space according to some implementations of the disclosure.

FIG. 5 illustrates an example of using a DSSS to update an ontology according to some implementations of the disclosure. Cluster groupings 502, 504, and 506 and various one-entity cluster groupings 508 were previously part of the DSSS. Each cluster grouping includes previously mapped entities represented as dots. Newly added entities are represented as asterisks "*" and labeled as 510a, 510b, and 510c. After being mapped, the ontology server 102 determines that the ontology should be updated in a manner where the newly added entities represented by 510a, 510b, and 510c are added to locations in the ontology neighboring entities identified in cluster grouping 504. A new cluster grouping 512 can be determined by the ontology server 102.

Although FIGS. 4 and 5 describe an example of an additive change, a removal change or an update (or repurpose) change can be performed without having to rebuild the ontology from scratch. For a removal change, the ontology server 102 can rebalance the ontology using tree rebalancing algorithms, for example, algorithms for rebalancing red and black trees. The ontology server 102 can identify the entities to be removed in the DSSS and then perform the rebalancing in the ontology.

A system for building ontologies according to some implementations of the present disclosure provides several advantages. For example, the system can build a dynamic ontology from unstructured data. The system can work with multiple modalities, that is, the system can ingest non-words, words, images, etc. The system can incorporate non-words similarity ingestion, enabling associating different non-words with each other. The system can enrich ontology building by keeping content sensitivity intact by using an outline of an unstructured document to build the ontology. The system can scale to multiple sources, allowing ingestion of multiple unstructured data to further enrich the ontology. The system utilizes a domain similarity search space to build a dynamic ontology and to identify areas in the ontology that may or may not change due to an update in one or more data sources.

Ontologies can be used in various applications, for example, quickly searching a knowledge base, determining relationships between entities, etc. Ontologies being applied to these applications can speed up and improve the quality of machine generated writing for scientific documents, news articles, etc. Knowing domain-specific vocabulary can enable a machine to generate more appropriate links and use better synonyms.

According to the embodiments of the present disclosure, the process or method described above with reference to the flow charts herein can be implemented in a computer software program. For example, an embodiment of the present disclosure includes a computer program product, which includes a computer program that is tangibly embedded in a non-transitory computer readable medium. The computer program includes program codes for executing the method as illustrated in the flow charts. In such an embodiment, the computer program can be downloaded and installed from a network via a communication unit, or be installed from a storage unit or memory store, or be installed from a ROM. The computer program, when executed by a processor, implements the above functions defined by the method of the embodiments of the present disclosure. It should be noted that the computer-readable medium described in the embodiments of the present disclosure can be a computer-readable signal medium or a computer-readable storage medium, or any combination of the above two. An example of the computer-readable storage medium can include, but is not limited to: an electrical, magnetic, optical, electromagnetic, infrared, or semiconductor systems, apparatuses or elements, or a combination of any of the above. A more specific example of the computer-readable storage medium can include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory device, or any suitable combination of the above. In the embodiments of the present disclosure, the computer readable storage medium can be any tangible or non-transitory medium containing or storing programs which may be used by a command execution system, apparatus or element or incorporated thereto. In the embodiments of the present disclosure, the computer-readable signal medium can include data signal in the base band or propagating as parts of a carrier wave, in which computer-readable program codes are carried. The propagating data signal can take various forms, including but not limited to an electromagnetic signal, an optical signal, or any suitable combination of the above. The computer-readable signal medium can also be any non-transitory computer-readable medium except for the computer-readable storage medium. The computer-readable signal medium is capable of transmitting, propagating or transferring programs for use by, or used in combination with, a command execution system, apparatus or element. The program codes contained on the computer-readable medium may be transmitted with any suitable medium, including but not limited to: wired, optical cable, RF (radio frequency) medium etc., or any suitable combination of the above.

The computer-readable medium can be included in the above electronic device; or a stand-alone computer-readable medium without being assembled into the electronic device. The computer-readable medium stores one or more computer programs. The one or more programs, when executed by the electronic device, cause the electronic device to carry out the functions described herein without manual or human intervention.

A computer program code for executing operations in the embodiments of the present disclosure can be compiled using one or more programming languages or combinations thereof. The programming languages include object-oriented programming languages, such as Java, Smalltalk, or C++, and also include conventional procedural programming languages, such as "C" language, or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer can be connected to a user's computer via any network, including local area network (LAN) or wide area network (WAN), or can be connected to an external computer (for example, connected via the Internet using an Internet service provider).

The flow charts and block diagrams in the accompanying drawings illustrate architectures, functions and operations that can be implemented according to the systems, methods and computer program products of the various embodiments of the present disclosure. In this regard, each of the blocks in the flow charts or block diagrams can represent a module, a program segment, or a code portion, said module, program segment, or code portion including one or more executable instructions for implementing specified logical functions. It should be further noted that, in some alternative implementations, the functions denoted by the blocks can occur in a sequence different from the sequences shown in the figures. For example, any two blocks presented in succession may be executed substantially in parallel, or they can sometimes be executed in a reverse sequence, depending on the functions involved. It should be further noted that each block in the block diagrams and/or flow charts as well as a combination of blocks in the block diagrams and/or flow charts can be implemented using a dedicated hardware-based system executing specified functions or operations, or by a combination of dedicated hardware and computer instructions.

The units or modules involved in the embodiments of the present disclosure can be implemented by software or hardware or combination of both. The described units or modules can also be provided in an electronic processor.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. An iterative system for dynamically creating and updating an ontology using unsupervised learning, the system including a non-transitory computer-readable medium storing computer-executable instructions thereon such that when the instructions are executed, the system is configured to:

ingest a set of codes from a code reference, the code reference including non-words and words, and each code in the set of codes including at least one of the non-words in the code reference;

associate the set of codes to a set of representations, forming descriptive links between the set of codes and the set of representations, each representation in the set of representations including at least one of the words in the code reference;

ingest an unstructured document having a general outline, the unstructured document including (i) at least one of the words in the code reference, (ii) at least one code in the set of codes, or (iii) both (i) and (ii);

determine the ontology from content of the unstructured document with an unsupervised learning algorithm that takes as inputs (i) the general outline of the unstructured document, (ii) the set of codes, (iii) the set of representations, and (iv) the descriptive links between the set of codes and the set of representations; and store the determined ontology in a database, the ontology having an acyclic directed graph structure.

2. The system of claim 1, further configured to:

vectorize the set of representations to obtain a set of vectorized representations, vectorize the set of codes to obtain a set of vectorized codes, such that an angle between a respective vectorized code in the set of vectorized codes and a respective vectorized representation in the set of vectorized representations is measurable to determine similarity when the respective vectorized code is associated with the respective vectorized representation.

3. The system of claim 2, further configured to:

remove stop words from (i) the code reference prior to associating the set of codes to the set of representations, (ii) the unstructured document prior to determining the ontology, or (iii) both (i) and (ii).

4. The system of claim 1, wherein parent nodes in the acyclic graph structure of the determined ontology are selected from the set of codes.

5. The system of claim 1, wherein parent nodes in the acyclic graph structure of the determined ontology are selected from the set of representations.

6. The system of claim 1, wherein parent nodes in the acyclic graph structure of the determined ontology are selected from section titles of the unstructured document.

7. The system of claim 1, wherein at least one of the non-words in the code reference includes (i) numbers, (ii) symbols, (iii) alphanumeric text, or (iv) any combination thereof.

8. The system of claim 1, wherein the set of codes comprise multiple subsets of codes including at least a first subset of codes, wherein the system is further configured to associate the first subset of codes to the set of representations before associating at least one other of the multiple subsets of codes.

9. The system of claim 8, further configured to:

associate the first subset of codes to the at least one other of the multiple subsets of codes, forming categorical links between the first subset of codes and the at least one other of the multiple subsets of codes, wherein a respective code of the first subset of codes associated with a respective code of the at least one other of the multiple subsets of codes is descriptively linked to a same or similar representation in the set of representations, and wherein the unsupervised learning algorithm further takes as inputs the familial links between the first subset of codes and the at least one other of the multiple subsets of codes.

10. The system of claim 9, wherein the multiple subsets of codes include two or more selected from the group consisting of: (i) International Statistical Classification of Diseases and Related Health Problems (ICD) codes, (ii) current procedural terminology (CPT) codes, (iii) Healthcare Common Procedure Coding System (HCPCS) codes, (iv) stock keeping unit (SKU) codes, (v) or any combination thereof.

11. The system of claim 1, further configured to:
ingest one or more corpora having additional words not present in the code reference; and
associate at least one of the additional words in the one or more corpora to at least one representation in the set of representations, wherein the unsupervised learning algorithm further takes as inputs the at least one of the additional words in the one or more corpora when determining the ontology from the content of the unstructured document.

12. The system of claim 11, wherein the one or more corpora include a layman terms reference, a synonyms reference, a state mandate, or any combination thereof.

13. The system of claim 12, further configured to perform named entity recognition on the content of the unstructured data while determining the ontology, the named entity recognition based on the layman terms reference, the synonyms reference, or both.

14. The system of claim 1, further configured to:
determine that there is a change to the code reference; and
update the ontology based on the change to the code reference.

15. The system of claim 14, wherein:
when the change to the code reference is an additive change, the system is configured to add nodes to the ontology; and
when the change is a removal change, the system is configured to rebalance the ontology.

16. An iterative system for dynamically creating and updating an ontology using unsupervised learning, the system including a non-transitory computer-readable medium storing computer-executable instructions thereon such that when the instructions are executed, the system is configured to:
ingest a set of codes from a code reference, the code reference including non-words and words, and each code in the set of codes including at least one of the non-words in the code reference;
associate the set of codes to a set of representations, forming descriptive links between the set of codes and the set of representations, each representation in the set of representations including at least one of the words in the code reference;
receive domain defined structure document, the domain defined structure document including parameters for at least one of (i) parent nodes of the ontology, (ii) child nodes of the ontology, or (iii) both (i) and (ii);
determine the ontology with an unsupervised learning algorithm that takes as inputs (i) the domain defined structure document, (ii) the set of codes, (iii) the set of representations, and (iv) the descriptive links between the set of codes and the set of representations; and
store the determined ontology in a database, the ontology having an acyclic directed graph structure.

17. An iterative method for dynamically creating and updating an ontology using unsupervised learning, the method comprising:
ingesting a set of codes from a code reference, the code reference including non-words and words, and each code in the set of codes including at least one of the non-words in the code reference;
associating the set of codes to a set of representations, forming descriptive links between the set of codes and the set of representations, each representation in the set of representations including at least one of the words in the code reference;
ingesting an unstructured document having a general outline, the unstructured document including (i) at least one of the words in the code reference, (ii) at least one code in the set of codes, or (iii) both (i) and (ii);
determining the ontology from content of the unstructured document with an unsupervised learning algorithm that takes as inputs (i) the general outline of the unstructured document, (ii) the set of codes, (iii) the set of representations, and (iv) the descriptive links between the set of codes and the set of representations; and
storing the determined ontology in a database, the ontology having an acyclic directed graph structure.

18. The method of claim 17, further comprising:
determining that there is a change to the code reference; and
updating the ontology based on the change to the code reference.

19. The method of claim 18, wherein:
when the change to the code reference is an additive change, updating the ontology includes adding nodes to the ontology; and
when the change is a removal change, updating the ontology includes rebalancing the ontology.

20. The method of claim 17, wherein associating the set of codes to the set of representations comprises:
vectorizing the set of representations to obtain a set of vectorized representations,
vectorizing the set of codes to obtain a set of vectorized codes, such that an angle between a respective vectorized code in the set of vectorized codes and a respective vectorized representation in the set of vectorized representations is measurable to determine similarity when the respective vectorized code is associated with the respective vectorized representation.

* * * * *